H. F. WAITE.
HIGH TENSION RECTIFYING SWITCH.
APPLICATION FILED APR. 24, 1916.
1,208,056.
Patented Dec. 12, 1916.
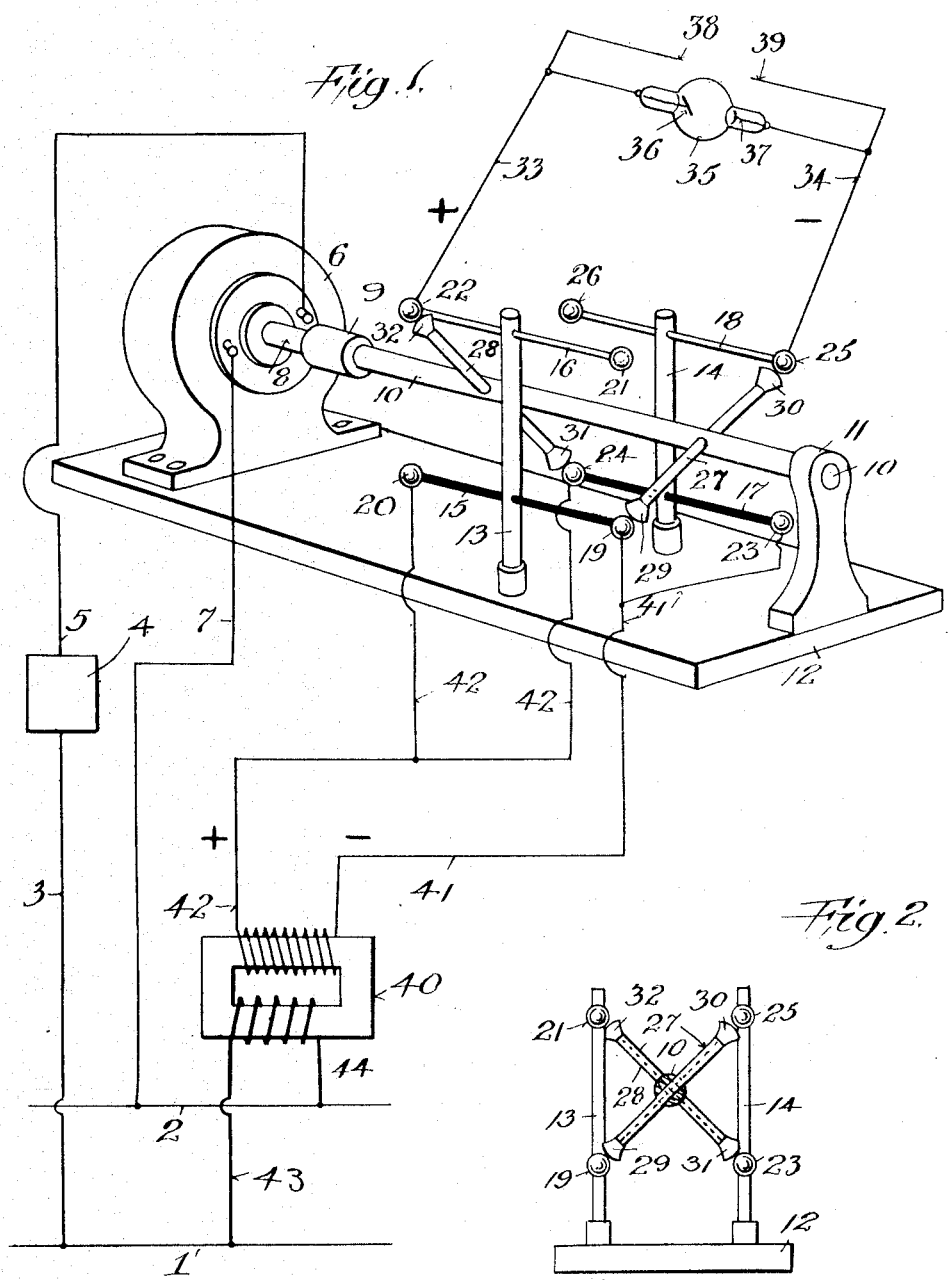

UNITED STATES PATENT OFFICE.

HARRY F. WAITE, OF WHITESTONE LANDING, NEW YORK.

HIGH-TENSION RECTIFYING-SWITCH.

1,208,056. Specification of Letters Patent. Patented Dec. 12, 1916.

Application filed April 24, 1916. Serial No. 93,345.

*To all whom it may concern:*

Be it known that I, HARRY F. WAITE, a citizen of the United States, residing at Whitestone Landing, in the county of Queens and State of New York, have invented a new and useful Improvement in High-Tension Rectifying-Switches; and I do hereby declare the following to be a full, clear, and exact description of the invention, such as will enable others skilled in the art to make and use same.

Heretofore it has been common to make systems of this character with a rotary member which is driven synchronously with an alternating current which is rectified while under high tension, say from 30,000 to 150,000 volts.

The object of this invention is to simplify a machine of this character and the parts connected therewith so that the rotating parts will be reduced to a minimum, all parts will be greatly simplified and improved and the apparatus made efficient.

These, and other objects are accomplished by my invention, one embodiment of which is hereinafter more particularly set forth.

For a more particular description of my invention, reference is to be had to the accompanying drawings, forming a part hereof, in which, Figure 1 is a perspective view of my improved system. Fig. 2 is a sectional view of a portion of the same.

Throughout the various views of the drawings, similar reference characters designate similar parts.

In systems of this character it is common to use either an alternating or a direct current as may be convenient. When an alternating current is employed, a synchronous motor is used, and when a direct current is employed it is customary to use an inverse rotary which transforms the direct current into an alternating current. In either case the alternating current is passed first to a step-up transformer where its tension is raised as desired, to whatever may be required, which may be from something like 30,000 to over 100,000 volts, and then the current is rectified so as to pass in one direction only through an X-ray tube. In the present embodiment of my invention, herein disclosed, for convenience, a synchronous motor is used with an alternating current, and it is obvious that this will be replaced by an inverse rotary where a direct current is employed.

As indicated in Fig. 1, an alternating current is supplied from the wires 1 and 2, and from the wire 1 a conductor 3 runs through a starting device 4 and wire 5 to a synchronous motor 6, and from the synchronous motor 6 the wire 7 runs to the wire 2, so that an alternating current drives the armature 8 of the motor synchronously with the alternations in the wires 1 and 2, say 90 degrees angular movement of the armature corresponds with 180 degrees electrical degrees of the current, or one complete alternation. The armature 8 has an insulated coupling or similar connection 9 with a shaft 10, the other end of which is journaled in a suitable bearing 11 which rises from the base 12 on which the motor 6 is mounted in any suitable way. The base 12 carries two supports 13 and 14 which are made in any convenient way, and essentially of insulating material, and the support 13 carries horizontally disposed rods 15 and 16, the lower and upper, and the support 14 carries the corresponding rods 17 and 18. Each rod has a ball at its end and, as there are four rods there are eight balls, and these balls are numbered as follows: on the rod 15, 19 and 20; on the rod 16, 21 and 22; on the rod 17, 23 and 24; and on the rod 18, 25 and 26. The rods 15 and 17 are made of insulating material and the rods 16 and 18 of metal so it is obvious that the balls on the rod 16 are always electrically connected, and the same is true of the balls on the rod 18, and balls on the rod 15 are not electrically connected, and the same is true of the balls on the rod 17, and these balls, at times, are cross-connected in a manner which will now be described.

Set in parallel planes, that is the planes of the ends of the rods and with ends adjacent to the balls, are the cross arms 27 and 28 and the arm 27 has two fins, one on each end numbered 29 and 30 respectively, and the cross connector 28 has the fins 31 and 32 respectively, and the fins on each arm are connected to a common rod of metal or similar conducting material which is insulated, either by the shaft 10 or other suitable means, so that in due season the right balls are cross connected to each other and there is no leakage of electricity. These fins 29, 30, 31 and 32 never touch the balls they cooperate with and always receive electricity across an air gap. Their outer peripheries are concentric with the center of the shaft 10 and they are given a suitable angular extent, say about 20 degrees, more or less, as desired.

The rods 16 and 18 are connected by wires 33 and 34 with an X-ray tube 35, the former with the anode 36 and the latter with the cathode 37, and these wires 34 and 35 are extended to the sparking points 38 and 39 with the air gaps between them to protect the tube 35, as is usual in such devices. The balls 19 and 23 are connected with one of the leads of the secondary of a step-up transformer 40 by a suitable wire 41, and the balls 24 and 25 are similarly connected by a wire 42. The primary of the transformer 40 is connected to the wires 1 and 2 through a pole changer, not shown, by wires 43 and 44.

In view of the foregoing, the operation of my improved device will be readily understood. Assuming that an alternating current is being delivered to the wires 1 and 2 and that the shaft 10 is driven synchronously by the motor 6 and the polarity is as indicated, and the fins are as shown with regard to their balls, the current in the secondary may be traced from the transformer 40, through the wire 42, ball 24, fins 31 and 32 of the arm 28, ball 22, wire 33, anode 36, cathode 37, wire 34, ball 25, fins 30 and 29 of the arm 27, ball 19, and wire 41 to the transformer 40. When the polarity is reversed the fins 31 and 32 will then be close to the then negative balls 20 and 26 while the fins 30 and 27 will be close to the then positive balls 23 and 21, so that the reversed current is rectified and the anode receives positive impulses and the cathode negative impulses, as before, and the tube 35 receives a proper current at all times.

There are no insulating barriers of any kind employed in this type of apparatus and no occasion for any as a spark cannot jump from one ball to another because the air gap between balls of opposite polarity is always sufficient to prevent arcing.

While I have shown and described one embodiment of my invention, it is obvious that it is not restricted thereto, but is broad enough to cover all structures that come within the scope of the annexed claims.

What I claim is:

1. In an alternating current rectifying switch the combination of a shaft; an arm carried by said shaft, provided with flaring fin-like extremities; a plurality of pairs of terminals associated with said arm and adapted to form spark gaps with its said extremities; a second arm carried by said shaft in angularly disposed relation to said first arm, said second arm being also provided with flaring fin-like extremities; a plurality of pairs of terminals associated with said second arm and adapted to form spark gaps with its extremities; and electrical connections between one terminal of each pair of terminals that are associated with said first arm and one terminal of each pair of terminals that are associated with said second arm, substantially as described.

2. In a rectifying switch the combination of a rotating shaft; a source of alternating current; means for rotating said shaft synchronously with the alternations of said current; a plurality of angularly disposed arms having fin-like extremities carried by said shaft; a plurality of series of balls arranged in close proximity to the paths of said fin-like extremities; electrical connections between certain of the balls of adjacent series; insulating means between certain of the balls of adjacent series; means for raising the potential of a portion of said current; and connections between said last named means and said ball series, whereby a high potential current may be rectified when said shaft is rotated, substantially as described.

3. In a rectifying switch the combination of a rotating shaft; a source of alternating current; means adapted to rotate said shaft synchronously with the alternations of said current; a pair of supports; an insulating rod carried by each of said supports; a conducting rod also carried by each of said supports; a conducting ball mounted on each end of each of said rods; a pair of angularly disposed arms carried by said shaft provided with flaring fin-like extremities adapted to traverse paths in close proximity to said balls; means adapted to raise the potential of a portion of said current; and suitable connections between said last named means and said balls, whereby the higher potential portion of said current may be rectified, substantially as described.

HARRY F. WAITE.